(12) United States Patent
Shin et al.

(10) Patent No.: US 11,385,730 B2
(45) Date of Patent: Jul. 12, 2022

(54) METHOD OF CONTROLLING OPERATION MODE USING ELECTRONIC PEN AND ELECTRONIC DEVICE FOR SAME

(71) Applicant: Samsung Electronics Co., Ltd., Suwon-si (KR)

(72) Inventors: Sangmin Shin, Suwon-si (KR); Jikwang Kang, Suwon-si (KR); Yeojeong Yoon, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/520,959

(22) Filed: Jul. 24, 2019

(65) Prior Publication Data
US 2020/0033961 A1    Jan. 30, 2020

(30) Foreign Application Priority Data
Jul. 27, 2018    (KR) .......................... 10-2018-0087963

(51) Int. Cl.
*G06F 3/038* (2013.01)
*G06F 3/0354* (2013.01)
*G06F 1/16* (2006.01)

(52) U.S. Cl.
CPC .......... *G06F 3/0383* (2013.01); *G06F 1/1637* (2013.01); *G06F 1/1656* (2013.01); *G06F 3/03545* (2013.01); *G06F 2203/0384* (2013.01)

(58) Field of Classification Search
CPC ............... G06F 3/03545; G06F 3/0383; G06F 2203/0384
See application file for complete search history.

(56) References Cited

U.S. PATENT DOCUMENTS

2009/0149219 A1    6/2009  Rhee et al.
2013/0082937 A1*   4/2013  Liu ..................... G06F 3/03545
                                                345/173
(Continued)

FOREIGN PATENT DOCUMENTS

EP    2 743 819 A2    6/2014
JP    2016-110522 A   6/2016
(Continued)

OTHER PUBLICATIONS

International Search Report dated Oct. 29, 2019, issued in an International application No. PCT/KR2019/009172.
Partial Supplementary European Search Report dated Jun. 18, 2021, issued in European Application No. 19840908.8-1216.
Extended European Search Report dated Oct. 6, 2021, issued in European Application No. 19840908.8-1216.
(Continued)

*Primary Examiner* — Mark Edwards
*Assistant Examiner* — Chayce R Bibbee
(74) *Attorney, Agent, or Firm* — Jefferson IP Law, LLP

(57) ABSTRACT

An apparatus and a method for detecting a black area of dynamic image content in an electronic device are provided. The electronic device may include a housing, a display device exposed through a portion of the housing, a recess disposed inside the housing and extending along a length of the housing, an electronic pen insertable into the recess and removable therefrom, at least one processor located inside the housing and operatively connected to the display device, and a memory operatively connected to the at least one processor. The memory stores instructions that, when executed, cause the at least one processor to identify whether the electronic pen is removed from the recess in a low-power mode, receive information related to the electronic pen when the electronic pen is removed from the recess, and execute an application, based on at least a portion of the information related to the electronic pen.

10 Claims, 14 Drawing Sheets

(56) References Cited

U.S. PATENT DOCUMENTS

| | | |
|---|---|---|
| 2014/0210744 A1 | 7/2014 | Song et al. |
| 2014/0298244 A1 | 10/2014 | Kim |
| 2014/0306909 A1* | 10/2014 | Pedersen ............. G06F 3/03545 |
| | | 345/173 |
| 2014/0313171 A1 | 10/2014 | Hong et al. |
| 2015/0103014 A1* | 4/2015 | Kim ..................... G06F 3/0412 |
| | | 345/173 |
| 2016/0054821 A1 | 2/2016 | Kim et al. |
| 2016/0100100 A1 | 4/2016 | Ryu |
| 2016/0109968 A1 | 4/2016 | Roh et al. |
| 2016/0154519 A1 | 6/2016 | Joo et al. |
| 2017/0168652 A1 | 6/2017 | Lipman et al. |
| 2017/0322642 A1 | 11/2017 | Zhang et al. |

FOREIGN PATENT DOCUMENTS

| | | |
|---|---|---|
| KR | 10-2007-0016330 A | 2/2007 |
| KR | 10-2014-0046327 A | 4/2014 |
| KR | 10-2014-0063337 A | 5/2014 |
| KR | 10-2014-0117137 A | 10/2014 |
| KR | 10-2015-0045048 A | 4/2015 |
| KR | 10-2016-0047385 A | 5/2016 |
| KR | 10-2017-0119201 A | 10/2017 |
| WO | 2017131283 A1 | 8/2017 |

OTHER PUBLICATIONS

Korean Office Action dated Apr. 25, 2022, issued in Korean Application No. 10-2018-0087963.

\* cited by examiner

METHOD OF CONTROLLING OPERATION MODE USING ELECTRONIC PEN AND ELECTRONIC DEVICE FOR SAME

CROSS-REFERENCE TO RELATED APPLICATION(S)

This application is based on and claims priority under 35 U.S.C. § 119 of a Korean patent application number 10-2018-0087963, filed on Jul. 27, 2018, in the Korean Intellectual Property Office, the disclosure of which is incorporated by reference herein in its entirety.

BACKGROUND

1. Field

The disclosure relates to an apparatus and a method for controlling an operation mode of an electronic device using an electronic pen of the electronic device.

2. Description of Related Art

With the development of information communication technologies and semiconductor technologies, electronic devices capable of processing information have been supplied. Electronic devices may provide various functions such as voice calls, messages, cameras, electronic payment, and broadcasting.

The electronic device may detect an input corresponding to contact, proximity, or pressure of a user's body (e.g., a finger) through a touch screen. The electronic device may also detect an input corresponding to contact or proximity of an electronic pen capable of performing more precise input than the input using the user's body.

The above information is presented as background information only to assist with an understanding of the disclosure. No determination has been made, and no assertion is made, as to whether any of the above might be applicable as prior art with regard to the disclosure.

SUMMARY

A user of an electronic device may write in content (for example, an image) displayed on the electronic device on the basis of input using an electronic pen or replace a key input with a gesture input of the electronic pen.

However, the electronic device requires complex manipulation on the part of the user in order to execute a function corresponding to the electronic pen, thereby deteriorating ease of use of the electronic pen by the user. For example, when the user of the electronic device adds a memo to a photographed image, the user may capture an image by executing a camera application. The user of the electronic device may select a captured image by executing an image management application and may select a menu for pen input to add the memo to the captured image through the electronic pen.

Aspects of the disclosure are to address at least the above-mentioned problems and/or disadvantages and to provide at least the advantages described below. Accordingly, an aspect of the disclosure is to provide an apparatus and a method for increasing the usability of the electronic pen in the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a display device exposed through a portion of the housing, a recess disposed inside the housing and extending along a length of the housing, an electronic pen insertable into the recess and removable therefrom, at least one processor located inside the housing and operatively connected to the display device, and a memory operatively connected to the at least one processor. The memory stores instructions that, when executed, configure the at least one processor to identify whether the electronic pen is removed from the recess in a low-power mode, receive information related to the electronic pen when the electronic pen is removed from the recess, and execute an application, based on at least a portion of the information related to the electronic pen.

In accordance with another aspect of the disclosure, a method of operating an electronic device is provided. The method includes identifying whether an electronic pen, insertable into a recess disposed inside a housing and extending along a length of the housing and removable therefrom, is removed from the recess in a low-power mode, receiving information related to the electronic pen when the electronic pen is removed from the recess, and executing an application, based on at least a portion of the information related to the electronic pen.

In accordance with another aspect of the disclosure, an electronic device is provided. The electronic device includes a housing, a display device exposed through a portion of the housing, a recess disposed inside the housing and extending along a length of the housing, an electronic pen insertable into the recess and removable therefrom, at least one processor located inside the housing and operatively connected to the display device, and a memory operatively connected to the at least one processor. The memory stores instructions that, when executed, configure the at least one processor to generate content when input through the electronic pen is detected, and execute an operation mode of the electronic device related to the content, based on the orientation of the electronic pen.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
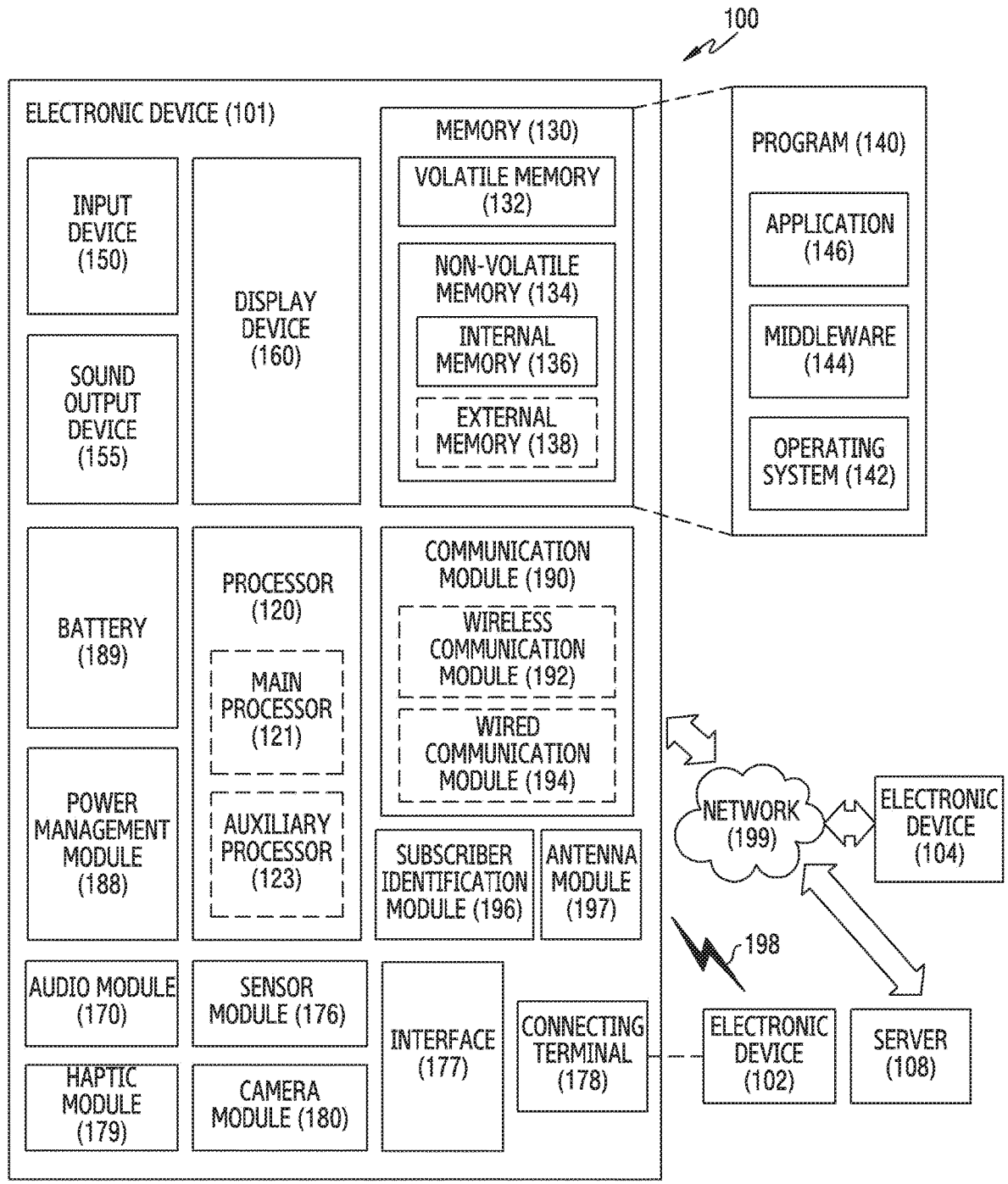
FIG. 1 is a block diagram illustrating an electronic device within a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120 (e.g., at least one processor), memory 130, an input device 150, a sound output device 155, a display device 160, an audio module 170, a sensor module 176, an interface 177, a haptic module 179, a camera module 180, a power management module 188, a battery 189, a communication module 190 (e.g., a transceiver), a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, the input device 150 may include an electronic pen. For example, when the electronic pen contacts or hovers over a touch panel (for example, the display device 160) of the electronic device 101, the electronic pen may resonate with an electromagnetic field periodically formed on the touch panel to generate a resonance signal.

According to an embodiment, when execution input through the electronic pen is received, the processor 120 may execute a mode for using the electronic pen. For example, when input through the electronic pen corresponding to a photographing button is received, the processor 120 may acquire an image through the camera module 180. The processor 120 may switch an operation mode of the electronic device 101 to a mode for using the electronic pen in association with the image acquired through the camera module 180. When input related to the image is received through the electronic pen, the processor 120 may combine the image with the input through the electronic pen and store the same in the memory 130.

According to an embodiment, the processor 120 may selectively drive the camera module 180 on the basis of the orientation of the electronic pen. For example, when the camera mode is executed, the processor 120 may identify whether there is an electronic pen functionally connected to the electronic device 101. When there is an electronic pen functionally connected to the electronic device 101, the processor 120 may activate a camera corresponding to the orientation of the electronic pen among a plurality of cameras (for example, a front camera and a rear camera) included in the camera module 180. For example, the front camera may be driven when the orientation of the electronic pen matches the orientation of the electronic device. For example, the rear camera may be driven when the orientation of the electronic pen is different from the orientation of the electronic device. For example, the orientation of the electronic pen may be an orientation of a nib of the electronic pen, and may be determined on the basis of sensing data of a 6-axis sensor included in the electronic pen. For example, the orientation of the electronic device may be the orientation of the display device 160 (for example, a viewfinder) of the electronic device, and may be determined on the basis of sensing data from the sensor module 176 (for example, a 6-axis sensor).

According to an embodiment, the processor 120 may correct the orientation of the electronic pen such that the orientation of the electronic device 101 matches the orientation of the electronic pen. For example, the orientation of the electronic device 101 and the orientation of the electronic pen may be acquired through the 6-axis sensor. The processor 120 may correct the orientation of the electronic pen provided from the electronic pen to match the electronic device 101 on the basis of the orientation (for example, the z-axis value) of the electronic pen inserted into the electronic device 101. For example, when the electronic pen is inserted forwards into the electronic device 101, it may be determined that the z-axis values of the electronic pen and the electronic device match each other. For example, when the electronic pen is inserted into the electronic device 101 backwards, the processor 120 may determine that the z-axis values of the electronic pen and the electronic device oppose each other. In this case, the processor 120 may correct the orientation of the electronic pen provided from the electronic pen to match the electronic device 101.

According to an embodiment, the processor 120 may determine the operation mode of the electronic device 101 on the basis of the orientation of the electronic pen. For example, when input corresponding to a photographing event is received, the processor 120 may identify the orientation of the electronic pen functionally connected to the electronic device 101. When the electronic pen has a first orientation (for example, in an upward direction), the processor 120 may operate in an image-photographing mode. For example, the processor 120 may store the image acquired through the camera module 180 on the basis of the generation of the photographing event. For example, when the electronic pen has a second orientation (for example, in a downward direction), the processor 120 may operate in an image-photographing-and-editing mode. For example, the processor 120 may acquire the image through the camera module 180 on the basis of the generation of the photographing event and execute the mode for using the electronic pen related to the image. The processor 120 may combine the image acquired through the camera module 180 with the input through the electronic pen into one image and store the same in the memory 130.

According to an embodiment, when the electronic pen is removed from the electronic device 101 in a low-power mode, the processor 120 may execute the application 146 corresponding to information related to the electronic pen. The information related to the electronic pen may include at least one of whether hover input through the electronic pen is detected, the time point at which the hover input is detected, the orientation of the electronic pen, and button input made through the electronic pen. For example, the low-power mode may include an inactive state of at least one module (for example, the display device 160) included in the electronic device 101 in order to reduce the amount of power consumed by the electronic device 101. For example, the low-power mode may include the inactive (or off) state of the display of the electronic device 101 and/or a locked state of the electronic device 101.

For example, when the electronic pen is removed from the electronic device 101 in the low-power mode, the processor 120 may identify the orientation of the electronic pen and execute an application related to the determined orientation of the electronic pen. When the orientation of the electronic pen is maintained in the first orientation (for example, in the upward direction) for a first predetermined time, the processor 120 may execute a camera application related to the first orientation of the electronic pen. When the orientation of the electronic pen is maintained in the second orientation (for example, in the downward direction) for a first predetermined time, the processor 120 may execute a memo application related to the second orientation of the electronic pen.

For example, when the electronic pen is removed from the electronic device 101 in the low-power mode, the processor 120 may execute the camera application or the memo application on the basis of the state of the application execution menu and/or button input made through the electronic pen. When the application execution menu is in an active state, the processor 120 may automatically execute the memo application in response to removal of the electronic pen. For example, when the application execution menu is in an active state, the processor 120 may execute the memo application while maintaining the locked state of the electronic device 101 in response to removal of the electronic pen. For example, after activating the display while maintaining the locked state, the processor 120 may display a screen related to execution of the memo application. The memo application executed in the locked state of the electronic device 101 may be a memo application configured to be executed in the low-power mode. The memo application executed in the locked state of the electronic device 101 may include at least a portion of the memo application executed in a normal mode of the electronic device 101 or may be classified as a separate application. When the application execution menu is in an inactive state, the processor 120 may determine whether input using a button of the electronic pen located (or disposed) within a hovering area or a first input (for example, a long input) using a button of the electronic pen located outside the hovering area is detected. For example, the hovering area may be an area in which the electronic device 101 is capable of detecting the hovering input through the electronic pen, and may have a range in which the electronic device 101 is capable of recognizing an electromagnetic field having the reference magnitude or more related to the electronic pen. When the input of the button (for example, a single press, double press, or long press) of the electronic pen located within the hovering area is detected, the processor 120 may execute the memo application. For example, the processor 120 may execute the memo application while maintaining the locked state of the electronic device 101 in response to the input of the button of the electronic pen located within the hovering area. For example, after activating the display while maintaining the locked state, the processor 120 may display a screen related to execution of the memo application. When the first input (for example, long input) of the button of the electronic pen located outside the hovering area is detected, the processor 120 may execute the camera application. For example, the processor 120 may execute the camera application while maintaining the locked state of the electronic device 101 in response to the first input of the button of the electronic pen located outside the hovering area. For example, after activating the display while maintaining the locked state, the processor 120 may display a screen related to execution of the camera application. The camera application executed in the locked state of the electronic device 101 may be a camera application configured to be executed in the low-power mode. The camera application executed in the locked state of the electronic device 101 may include at least a portion of the camera application executed in the normal mode of the electronic device 101, or may be classified as a separate application. When the first input of the button of the electronic pen located outside the hovering area is detected while the memo application is executed in the locked state, the processor 120 may switch the memo application execution mode to the camera application execution mode while maintaining the locked state. When the memo application execution mode is switched to the camera application execution mode, the processor 120 may terminate the memo application. For example, the single press may include button input including pressing and releasing a button of the electronic pen detected within a first reference time. For example, the double press may include button input including pressing and releasing a button of the electronic pen detected successively two times within a second reference time. The long press may include button input including pressing of the button of the electronic pen detected for a third reference time. The first reference time may be the same as or different from the second reference time and/or the third reference time. The second reference time may be the same as or different from the third reference time.

According to an embodiment, when no input is received for a second predetermined time while service using the electronic pen is provided or when no input is received for a second predetermined time after the electronic pen is removed from the electronic device 101, the processor 120 may switch to the low-power mode and control the display (for example, the display device 160) to be deactivated. When the input of the button of the electronic pen (for example, single press, double press, or long press) located within the hovering area is detected in the low-power mode, the processor 120 may execute the memo application. For example, the processor 120 may execute the memo application while maintaining the locked state of the electronic device 101. When a first input (for example, long press) of the button of the electronic pen located outside the hovering area is detected in the low-power mode, the processor 120 may execute the camera application. For example, the processor 120 may unlock the locked state of the electronic device 101 and execute the camera application. Unlocking the locked state of the electronic device 101 may indicate an operation of the electronic device 101 in the normal mode. When a second input (for example, single press or double press) of the electronic button located outside the hovering area is detected in the low-power mode, the processor 120 may switch the operation mode of the electronic device 101 to the normal mode by unlocking the locked state of the electronic device 101. For example, the display device 160 may display the screen displayed right before the electronic device 101 switches to the low-power mode on the basis of the unlocking of the locked state of the electronic device 101. The second predetermined time may be the same as or different from the first predetermined time.

According to an embodiment, the electronic device 101 may include a housing. For example, the housing may include a first surface (for example, a front surface or an upper surface) in a first direction of the electronic device 101 (for example, a +z-axis direction), a second surface (for example, a rear surface or a lower surface) in a direction opposite the first surface, and a side surface disposed to surround at least a portion of the first surface and the second surface. For example, the display device 160 may be configured to be exposed to the outside through a portion of the housing.

Figure 2:
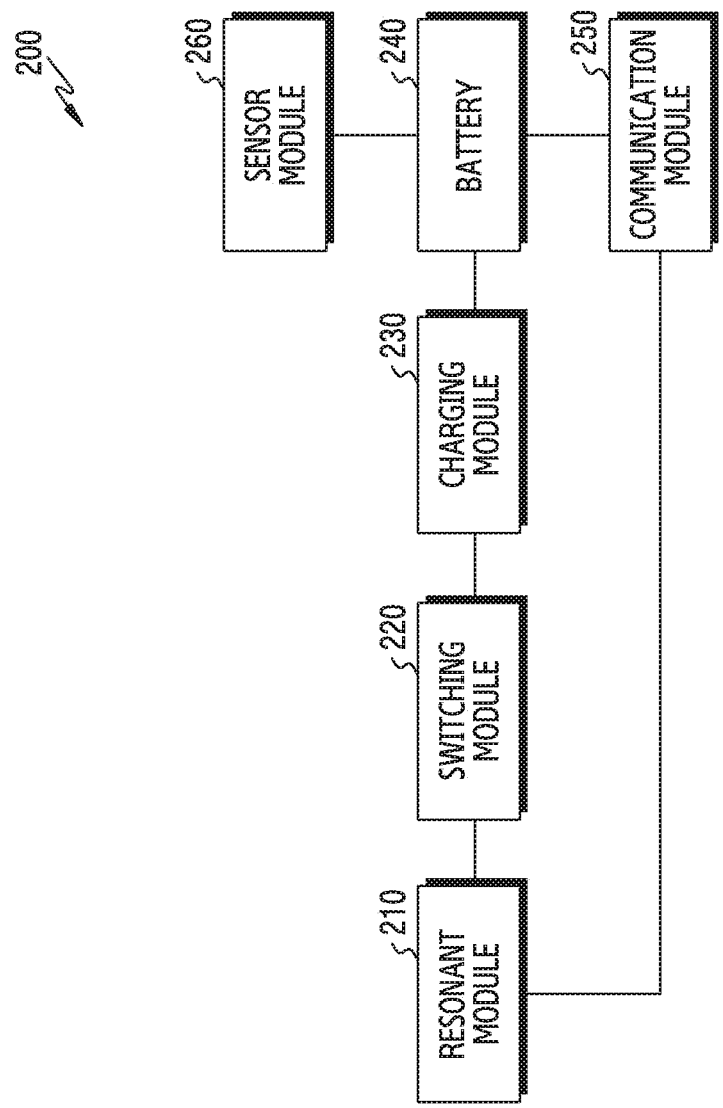
FIG. 2 is a block diagram illustrating an electronic pen according to an embodiment of the disclosure.

FIG. 2 is a block diagram illustrating an electronic pen according to an embodiment of the disclosure.

Referring to FIG. 2, an electronic pen 200 may include at least one of a resonant module 210, a switching module 220, a charging module 230, a battery 240, a communication module 250, or a sensor module 260.

According to an embodiment, the resonant module 210 may resonate with an electromagnetic field formed by the electronic device (for example, the electronic device 101 of FIG. 1) and generate a resonance signal. For example, when the electronic pen 200 contacts the touch panel of the electronic device 101, the resonant module 210 may resonate with an electromagnetic field periodically formed on the touch panel and generate a resonance signal. For example, when the electronic pen 200 is stored in a storage space of the electronic device 101, the resonant module 210 may resonate with an electromagnetic field periodically formed by a detection sensor included in the storage space and generate a resonance signal. For example, the resonant module 210 may further include a variable capacitor, the capacitance of which varies depending on the pen pressure of the electronic pen 200. For example, the storage space may be configured in the form of a recess extending a long length on the basis of the shape of the electronic pen 200 within the housing of the electronic device 101.

According to an embodiment, the switching module 220 may connect the resonant module 210 to the charging module 230 or block the resonant module 210 from the charging module 230. For example, the switching module 220 may selectively connect the resonant module 210 and the charging module 230 on the basis of the intensity of the resonance signal generated by the resonant module 210.

According to an embodiment, when the charging module 230 is connected to the resonant module 210 by the switching module 220, the charging module 230 may rectify the resonance signal generated by the resonant module 210 to a direct-current signal and provide the direct-current signal to a battery 240.

According to an embodiment, the battery 240 may supply power for driving the communication module 250 and the sensor module 260. For example, the battery 240 may be charged using the direct-current signal (direct-current power) provided from the charging module 230. The battery 240 may include a super capacitor.

According to an embodiment, the communication module 250 may transmit state information and input information of the electronic pen 200 to an external device (for example, the electronic device 101) through a short-range communication scheme. For example, when input corresponding to a button (not shown) of the electronic pen 200 is received, the communication module 250 may transmit button input information to the electronic device 101. For example, the communication module 250 may transmit orientation information of the electronic pen 200 (for example, sensing data of the 6-axis sensor) acquired through the sensor module 260 or remaining charge information of the battery 240 to the electronic device 101. For example, the short-range communication scheme may include at least one of Bluetooth, Bluetooth Low Energy (BLE), and WLAN.

According to an embodiment, the sensor module 260 may generate an electric signal or a data value corresponding to the internal state of operation of the electronic pen 200 or an external environment state. For example, the sensor module 260 may include at least one of a 6-axis sensor, a battery remaining charge detection sensor, and a pressure sensor.

According to various embodiments of the disclosure, an electronic device (for example, the electronic device 101 of FIG. 1) includes: a housing; a display device (for example, the display device 160 of FIG. 1) exposed through a portion of the housing; a recess disposed inside the housing and extending a long length; an electronic pen (for example, the electronic pen 200 of FIG. 2) inserted into the recess to be removable therefrom; a processor (for example, the processor 120 of FIG. 1) located inside the housing and operatively connected to the display device; and a memory (for example, the memory 130 of FIG. 1) operatively connected to the processor, wherein the memory stores instructions causing the processor to, when executed, identify whether the electronic pen is removed from the recess in a low-power mode, receive information related to the electronic pen when the electronic pen is removed from the recess, and execute an application, based on at least a portion of the information related to the electronic pen.

According to various embodiments, the information related to the electronic pen includes at least one of whether a hover input through the electronic pen is detected, the time point at which a hover input is detected, the orientation of the electronic pen, and input information of a button included in the electronic pen.

According to various embodiments, the housing may further include a wireless communication circuit (for example, the communication module 190 of FIG. 1), and the instructions may receive at least one of the orientation of the electronic pen and the input information of the button included in the electronic pen from the electronic pen through short-range wireless communication using the wireless communication circuit.

According to various embodiments, the short-range wireless communication may include at least one of Bluetooth and Bluetooth Low Energy (BLE).

According to various embodiments, the instructions may acquire the input information of the button included in the electronic pen, execute a memo application when the input information of the button included in the electronic pen satisfies a first predetermined condition, and execute a camera application when the input information of the button included in the electronic pen satisfies a second predetermined condition.

According to various embodiments, the first predetermined condition may include a condition related to input of a button of the electronic pen located within a hovering area, and the second predetermined condition may include a condition related to input of a button of the electronic pen located outside the hovering area.

According to various embodiments, the instructions may identify the orientation of the electronic pen, execute a camera application when the orientation of the electronic pen is maintained in a first orientation for a predetermined time, and execute a memo application when the orientation of the electronic pen is maintained in a second orientation for a first predetermined time.

According to various embodiments, the instructions may identify the orientation of the electronic pen, based on sensing data of a 6-axis sensor included in the electronic pen received from the electronic pen through the short-range wireless communication.

In accordance with another aspect of the disclosure, an electronic device (for example, the electronic device 101 of FIG. 1) includes: a housing; a display device (for example, the display device 160 of FIG. 1) exposed through a portion of the housing; a recess disposed inside the housing and extending a long length; an electronic pen (for example, the electronic pen 200 of FIG. 2) inserted into the recess to be removable therefrom; a processor (for example, the processor 120 of FIG. 1) located inside the housing and operatively connected to the display device; and a memory (for example, the memory 130 of FIG. 1) operatively connected to the processor, wherein the memory stores instructions to cause the processor to, when executed, generate content when input through the electronic pen is detected and execute an operation mode of the electronic device related to the content based on the orientation of the electronic pen.

According to various embodiments, the housing may further include a wireless communication circuit (for example, the communication module 190 of FIG. 1), and the instructions may identify the orientation of the electronic pen, based on sensing data of a 6-axis sensor included in the electronic pen received from the electronic pen through the short-range wireless communication using the wireless communication circuit.

According to various embodiments, the instructions may cause the electronic device to operate in an image-photographing mode when the orientation of the electronic pen is a first orientation and cause the electronic device to operate in an image-photographing-and-editing mode when the orientation of the electronic pen is a second orientation different from the first orientation.

According to various embodiments, the electronic device may further include a plurality of cameras (for example, the camera module 180 of FIG. 1), and the instructions may activate at least one of the plurality of cameras corresponding to the orientation of the electronic pen.

Figure 3:
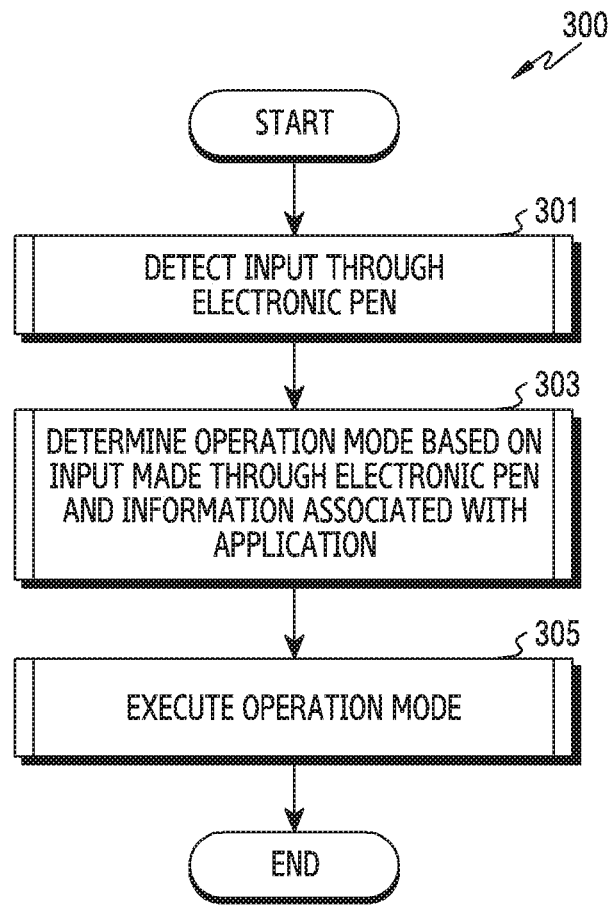
FIG. 3 is a flowchart illustrating an operation in which the electronic device determines an operation mode on the basis of input through the electronic pen according to an embodiment of the disclosure.

FIG. 3 is a flowchart 300 illustrating an operation in which the electronic device determines an operation mode on the basis of input through the electronic pen according to an embodiment of the disclosure.

Figure 4A:
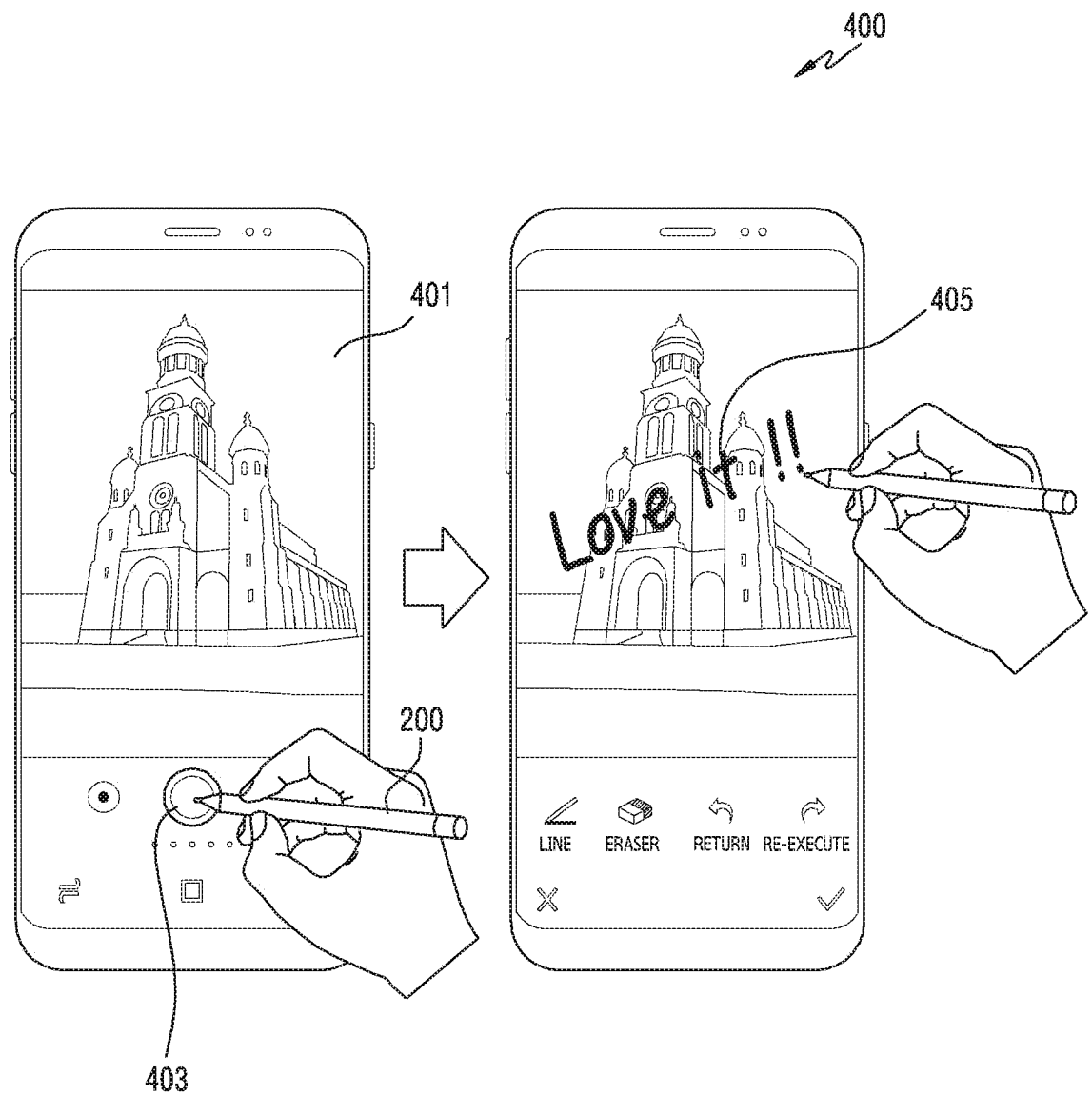
FIG. 4A illustrates a method of executing an operation mode corresponding to the electronic pen on the basis of input through the electronic pen according to an embodiment of the disclosure.
Figure 4B:
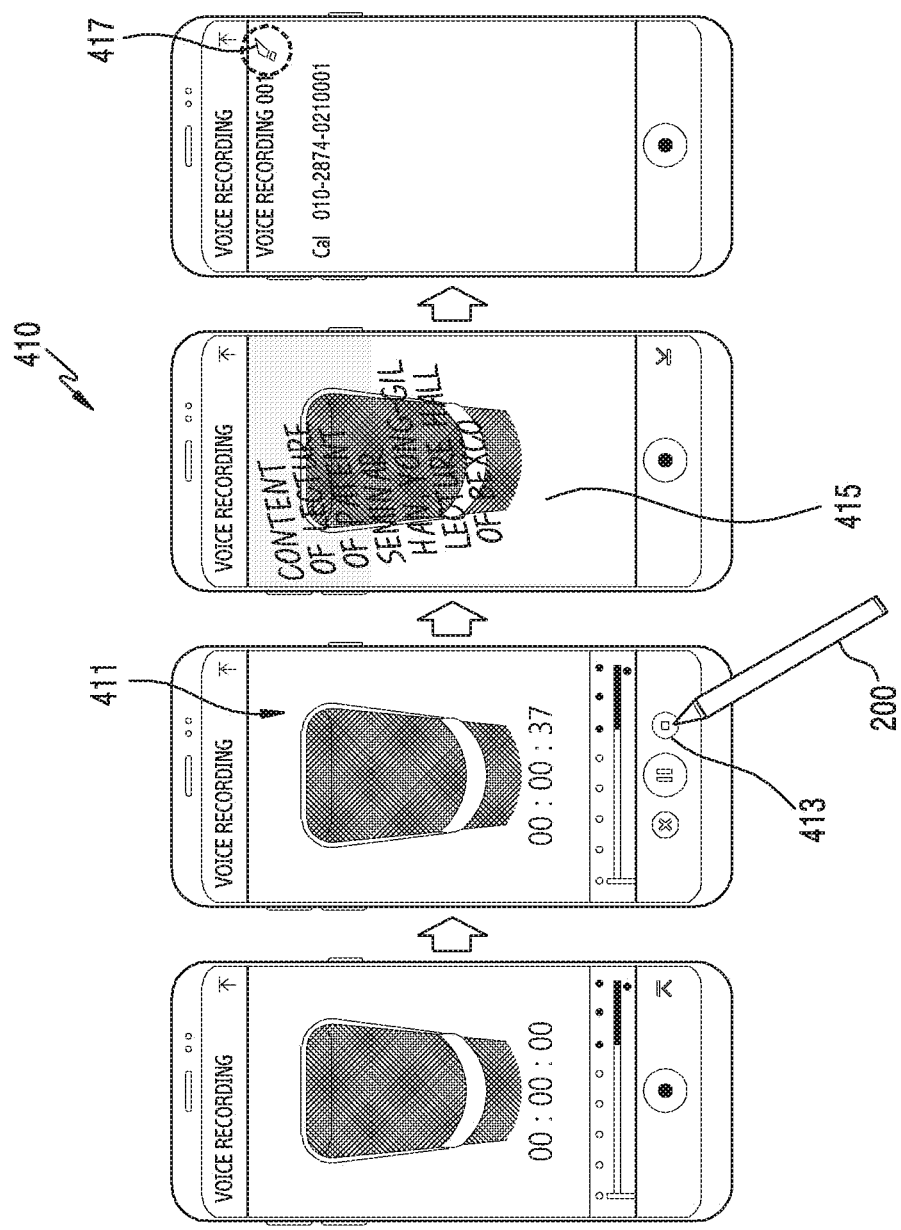
FIG. 4B illustrates a method of executing an operation mode corresponding to the electronic pen on the basis of input through the electronic pen according to an embodiment of the disclosure.
Figure 4C:
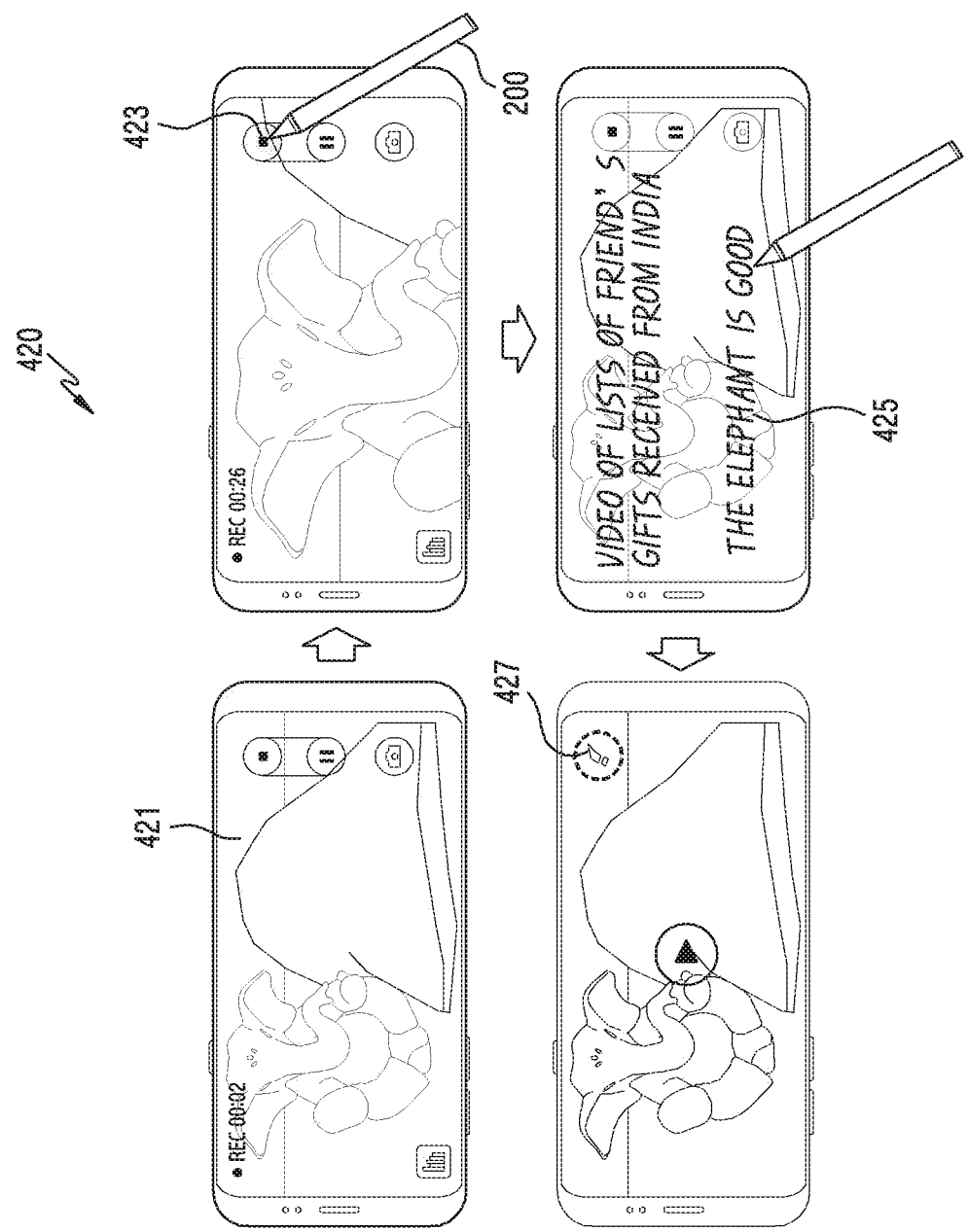
FIG. 4C illustrates a method of executing an operation mode corresponding to the electronic pen on the basis of input through the electronic pen according to an embodiment of the disclosure.

FIG. 4A is a diagram 400 illustrating a method of executing an operation mode corresponding to the electronic pen on the basis of input through the electronic pen according to an embodiment of the disclosure, FIG. 4B is a diagram 410 illustrating a method of executing an operation mode corresponding to the electronic pen on the basis of input through the electronic pen according to an embodiment of the disclosure, and FIG. 4C is a diagram 420 illustrating a method of executing an operation mode corresponding to the electronic pen on the basis of input through the electronic pen according to an embodiment of the disclosure.

Hereinafter, the electronic device may include the electronic device 101 of FIG. 1 or at least a portion (for example, the processor 120) of the electronic device 101. The electronic pen may include the electronic pen 200 of FIG. 2 or at least a portion of the electronic pen 200.

Referring to FIG. 3, the electronic device 101 may detect input through the electronic pen 200 related to the generation of content (for example, an image, a dynamic image, or audio data) in operation 301. For example, the processor 120 may output an image (for example, a preview image 401) acquired through the camera module 180 to the display device 160, as illustrated in FIG. 4A. The processor 120 may detect input through the electronic pen 200 corresponding to a photographing button 403 included in a user interface for image capture. For example, the processor 120 may record an audio signal (for example, a voice signal) acquired through a microphone (for example, the input device 150), as illustrated in FIG. 4B. The processor 120 may detect input through the electronic pen 200 corresponding to a recording termination button 413 included in a user interface 411 for a recording service while an audio signal is being recorded. For example, the processor 120 may photograph a dynamic image 421 through the camera module 180, as illustrated in FIG. 4C. The processor 120 may detect input through the electronic pen 200 corresponding to a dynamic image capture termination button (or a photographing end button) 423 included in a user interface for dynamic image capture.

The electronic device may determine the operation mode of the electronic device 101 related to the electronic pen 200 on the basis of input through the electronic pen 200 and information on an application (for example, the application 146 of FIG. 1) executed by the electronic device 101 in operation 303. The electronic device 101 may determine a mode for editing, using the electronic pen 200, content (for example, an image, a recorded file, or a dynamic image file) acquired through the application 146 executed by the electronic device 101. For example, when input through the electronic pen 200 corresponding to the photographing button 403 is detected as illustrated in FIG. 4A, the processor 120 may select the operation mode of the electronic device 101 as an image-capturing-and-editing mode. For example, the image-capturing-and-editing mode may include an operation mode for acquiring an image through the camera module 180 and editing the image through the electronic pen 200. For example, when the input through the electronic pen 200 corresponding to the recording termination button 413 is detected, as illustrated in FIG. 4B, the processor 120 may select a writing mode as the operation mode of the electronic device 101. For example, the writing mode may include an operation mode for adding additional information to the recorded file through the electronic pen 200. For example, when the input through the electronic pen 200 corresponding to the dynamic image capture termination button (or photographing end button) 423 is detected as illustrated in FIG. 4C, the processor 120 may select a dynamic image editing mode as the operation mode of the electronic device 101. For example, the dynamic image editing mode may include an operation mode for adding additional information to the dynamic image file recorded by the electronic device 101 through the electronic pen 200.

The electronic device 101 may execute the operation mode of the electronic device 101 related to the electronic pen 200 in operation 305. For example, when the input through the electronic pen 200 corresponding to the photographing button 403 is detected as illustrated in FIG. 4A, the processor 120 may capture an image through the camera module 180 and switch to the editing mode. When the input through the electronic pen 200 is received in the editing mode, the processor 120 may display information 405 corresponding to the input through the electronic pen 200 such that it overlaps at least a portion of the image. When the editing mode ends, the processor 120 may store the information 405 corresponding to the input through the electronic pen 200 and the captured image as one image. For example, one image may be generated separately from the captured image, or the captured image may be updated to the one image. For example, when the input by the electronic pen 200 corresponding to the recording termination button 413 is detected as illustrated in FIG. 4B, the processor 120 may switch to the writing mode corresponding to the recorded file. The processor 120 may store information input through the electronic pen 200 in the writing mode as additional information 415 related to the recorded file. For example, when information related to the recorded file is displayed, the display device 160 may display an icon 417 indicating the existence of the additional information related to the recorded file. For example, when the input through the electronic pen 200 corresponding to the dynamic image capture termination button 423 is detected, as illustrated in FIG. 4C, the processor 120 may switch to the editing mode corresponding to the dynamic image file. For example, the processor 120 may capture an image at the time point at which the input through the electronic pen 200 is detected and execute the editing mode. The processor 120 may store information (for example, information 425) input through the electronic pen 200 in the editing mode as additional information related to the dynamic image file. For example, when the dynamic image file is displayed, the display device 160 may display an icon 427 indicating the existence of additional information in at least a portion of the dynamic image file (for example, a thumbnail).

Figure 5:
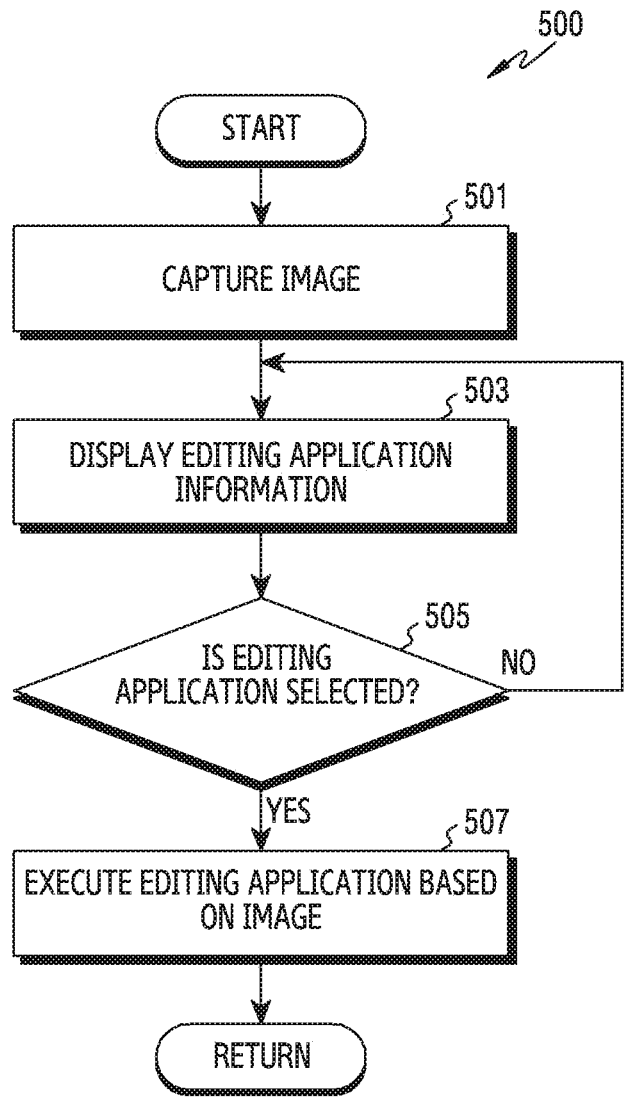
FIG. 5 is a flowchart illustrating an operation in which the electronic device selects an editing application corresponding to the electronic pen according to an embodiment of the disclosure.

FIG. 5 is a flowchart 500 illustrating an operation in which the electronic device selects an editing application corresponding to the electronic pen according to an embodiment of the disclosure.

Figure 6:
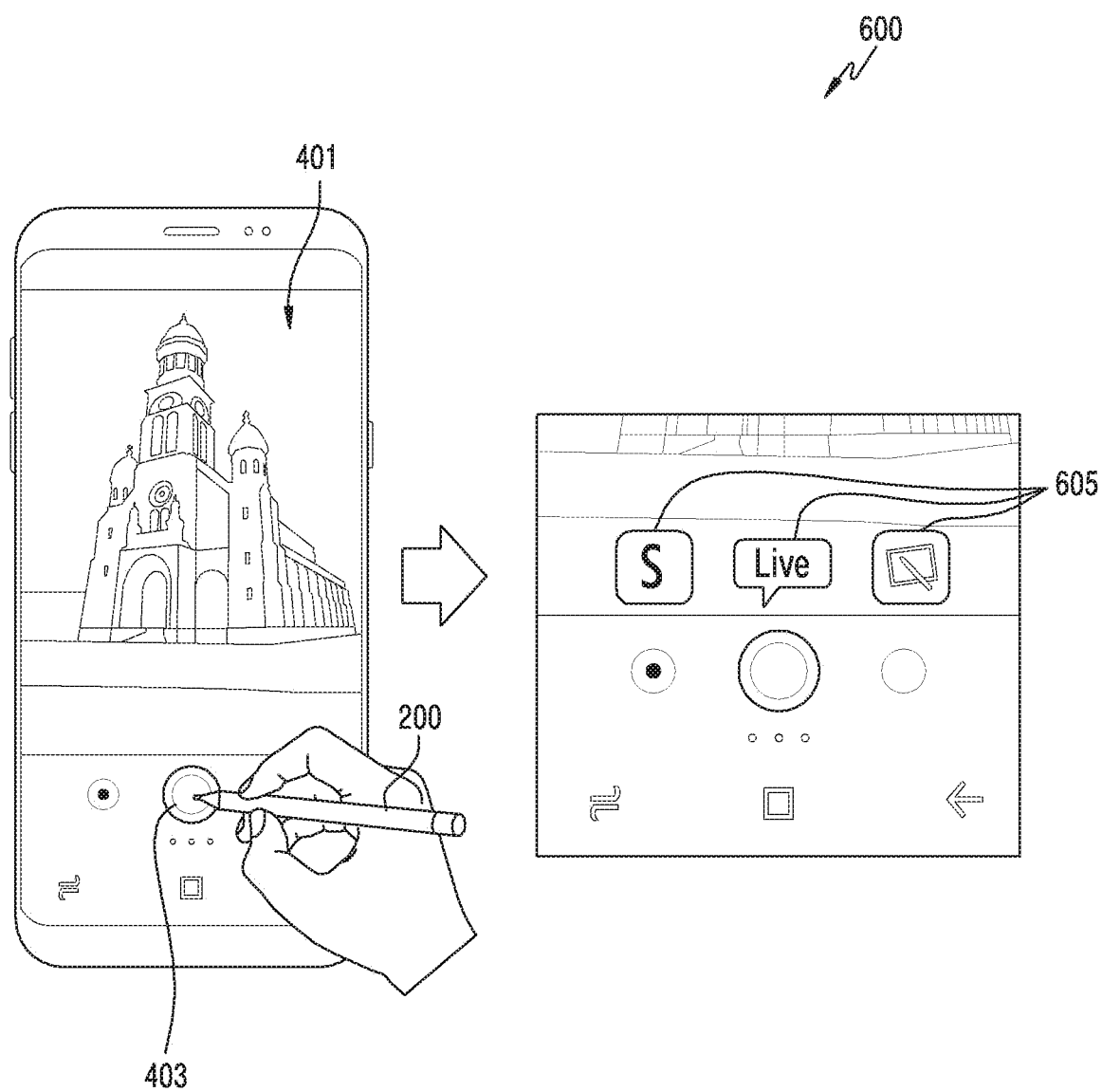
FIG. 6 illustrates a screen for displaying an editing application corresponding to the electronic pen according to an embodiment of the disclosure.

FIG. 6 illustrates a screen 600 for displaying an editing application corresponding to the electronic pen according to an embodiment of the disclosure.

The following description may be operations for executing the operation mode of the electronic device related to the electronic pen 200 on the basis of the input through the electronic pen (for example, the electronic pen 200 of FIG. 2) in operations 303 to 305 of FIG. 3. Hereinafter, the electronic device may include the electronic device 101 of FIG. 1 or at least a portion (for example, the processor 120) of the electronic device 101.

Referring to FIG. 5, when the input through the electronic pen 200 is received (for example, in operation 301 of FIG. 3), the electronic device 101 may capture an image through a camera (for example, the camera module 180) in operation 501. For example, the processor 120 may detect the input through the electronic pen 200 corresponding to the photographing button 403 in the state in which the preview image 401 is displayed, as illustrated in FIG. 6. The processor 120 may capture an image at the time point at which the input through the electronic pen 200 corresponding to the photographing button 403 is detected through the camera module 180.

In operation 503, the electronic device 101 may display information on at least one editing application capable of editing the captured image through the electronic pen 200. For example, the processor 120 may display the image captured using the camera module 180 on the display device 160. The display device 160 may display, in a portion of the captured image, icons 605 corresponding to editing applications that can be used to edit the captured image, as illustrated in FIG. 6.

The electronic device 101 may identify whether an editing application for editing the captured image is selected using the electronic pen 200 in operation 505. For example, the processor 120 may identify whether input corresponding to at least one icon among the icons 605 corresponding to the editing applications displayed on the display device 160 is received as illustrated in FIG. 6.

When no editing application is selected (for example, "No" in operation 505), the electronic device 101 may display information on at least one editing application capable of editing the captured image through the electronic pen 200 in operation 503. For example, when no input is received for a third predetermined time from the time point at which information on the editing applications is displayed, the processor 120 may terminate the editing mode of the captured image. The display device 160 may display the preview image acquired through the camera module 180.

When an editing application is selected ("Yes" in operation 505), the electronic device 101 may execute the selected editing application and edit the captured image through the electronic pen 200 in operation 507. For example, the processor 120 may attach the captured image to the user interface of the editing application and execute the editing mode (for example, a handwriting mode). The processor 120 may display information corresponding to the input through the electronic pen 200 such that it overlaps at least a portion of the captured image.

Figure 7:
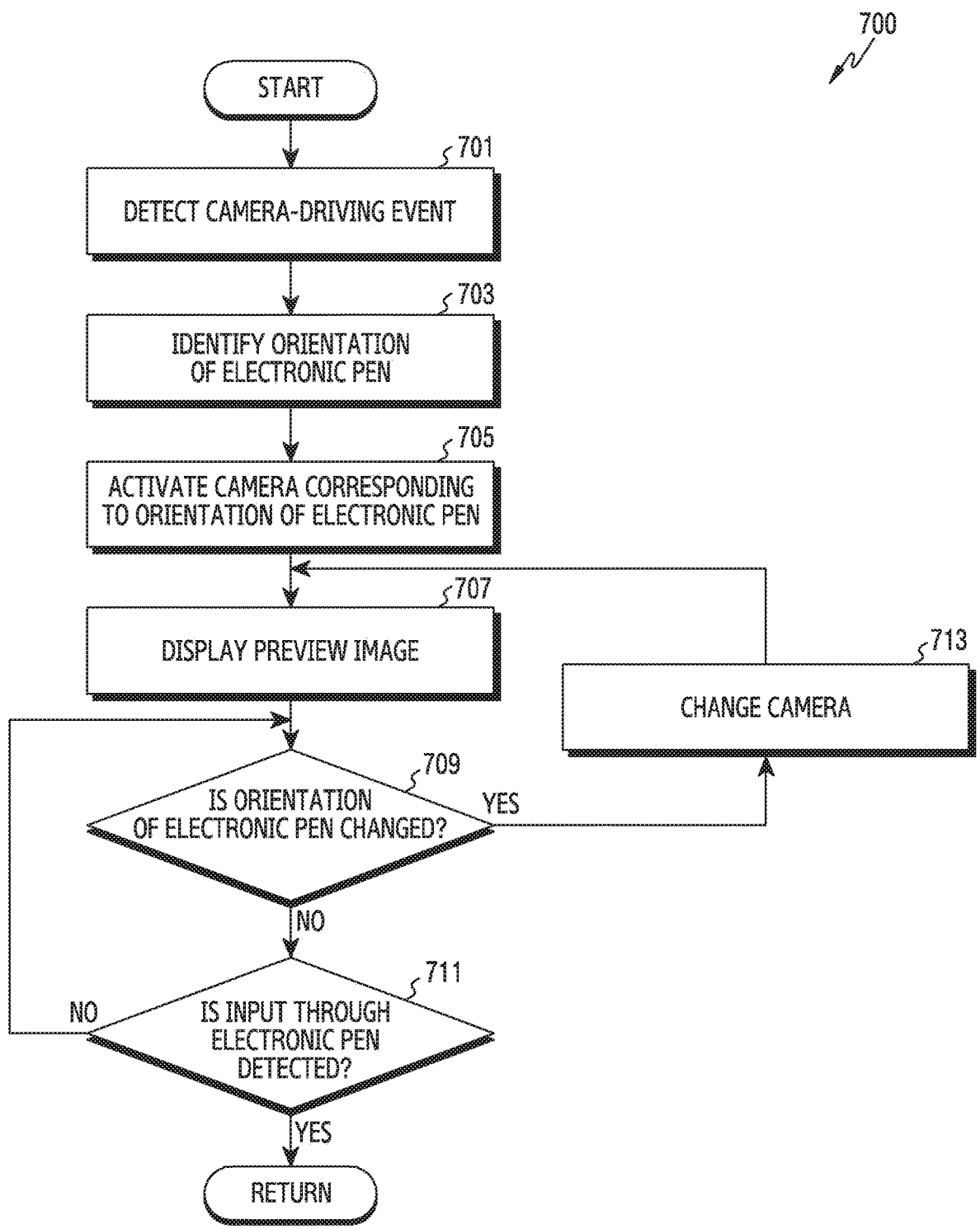
FIG. 7 is a flowchart illustrating an operation in which the electronic device drives a camera corresponding to the orientation of the electronic pen according to an embodiment of the disclosure.

FIG. 7 is a flowchart 700 illustrating an operation in which the electronic device drives a camera corresponding to the orientation of the electronic pen according to an embodiment of the disclosure.

The following description may be an operation for detecting the input through the electronic pen (for example, the electronic pen 200 of FIG. 2) in operation 301 of FIG. 3. Hereinafter, the electronic device may include the electronic device 101 of FIG. 1 or at least a portion (for example, the processor 120) of the electronic device 101.

Referring to FIG. 7, the electronic device 101 may detect the generation of an event for driving the camera (for example, the camera module 180 of FIG. 1) in operation 701. For example, the processor 120 may receive input (for example, touch input) corresponding to an icon related to a camera application through the input device 150.

When the event for driving the camera (camera module 180) is generated, the electronic device 101 may identify the orientation of the electronic pen 200 in operation 703. For example, the processor 120 may receive orientation information of the electronic pen 200 from the electronic pen 200 through the communication module 190. For example, the orientation information of the electronic pen 200 is sensing data of the 6-axis sensor (for example, the sensor module 260 of FIG. 2) of the electronic pen 200, and may be received from the electronic pen 200 in response to a request from the electronic device 101.

The electronic device 101 may activate the camera (camera module 180) corresponding to the orientation of the electronic pen 200 among the plurality of cameras 180 in operation 705. For example, when the orientation of the electronic pen 200 is the same as the orientation of the electronic device 101, the processor 120 may determine that the electronic pen 200 faces the user. In this case, the processor 120 may activate a first camera (a front camera) located in the direction in which the electronic device 101 is oriented. For example, when the orientation of the electronic pen 200 is opposite the orientation of the electronic device 101, the processor 120 may determine that the electronic pen 200 faces a subject. In this case, the processor 120 may activate a second camera (rear camera) located in the orientation opposite the orientation of the electronic device 101. For example, the orientation of the electronic pen 200 may include the orientation of a nib (not shown) of the electronic pen 200 and the orientation of the electronic device 101 may include the orientation of the display device 160 (for example, viewfinder) of the electronic device 101.

The electronic device 101 may output the preview image, acquired through the activated camera (camera module 180), through the display device 160 in operation 707. For example, when it is determined that the electronic pen 200 is oriented so as to face the user, the processor 120 may control the display device 160 to display the preview image acquired through the front camera. For example, when it is determined that the electronic pen 200 is oriented so as to face a subject located in a direction opposite the user, the processor 120 may control the display device 160 to display the preview image acquired through the rear camera.

The electronic device 101 may identify whether the orientation of the electronic pen 200 is changed in operation 709. For example, the processor 120 may identify whether the orientation of the electronic pen 200 is changed on the basis of sensing data of the 6-axis sensor (for example, the sensor module 260 of FIG. 2) received from the electronic pen 200. For example, the sensing data of the 6-axis sensor acquired from the electronic pen 200 may be periodically transmitted, or may be transmitted to the electronic device 101 at a time point at which a change thereof is detected.

When the orientation of the electronic pen 200 is maintained (for example, "No" in operation 709), the electronic device 101 may identify whether input through the electronic pen 200 is detected in operation 711. For example, the processor 120 may identify whether input through the electronic pen 200 related to the generation of content is received through the input device 150, as illustrated in FIGS. 4A to 4C.

When no input through the electronic pen 200 is detected (for example, "No" in operation 711), the electronic device 101 may identify the orientation of the electronic pen 200 is changed in operation 709.

When the orientation of the electronic pen 200 is changed (for example, "Yes" in operation 709), the electronic device 101 may switch the activated camera (camera module 180) of the electronic device 101 on the basis of the changed orientation of the electronic pen 200 in operation 713. For example, when the orientation of the electronic pen 200 is changed to the orientation opposite the orientation of the electronic device 101, the processor 120 may activate the second camera (rear camera) located in the direction opposite the direction in which the electronic device 101 is oriented. For example, the first camera (front camera), located in the direction in which the electronic device 101 is oriented, may be deactivated.

Figure 8:
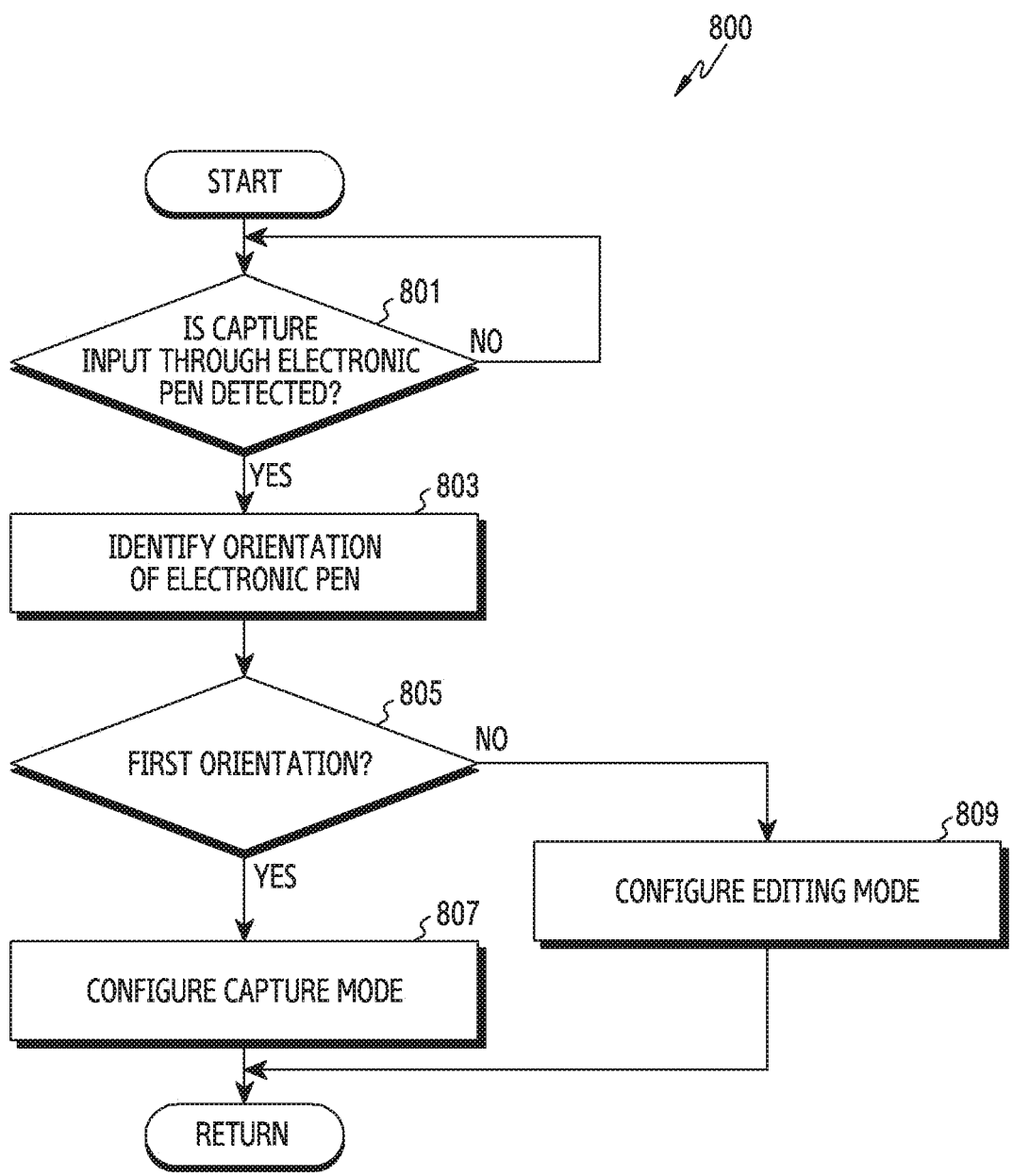
FIG. 8 is a flowchart illustrating an operation in which the electronic device configures an operation mode corresponding to the orientation of the electronic pen according to an embodiment of the disclosure.

FIG. 8 is a flowchart 800 illustrating an operation in which the electronic device configures the operation mode corresponding to the orientation of the electronic pen according to an embodiment of the disclosure.

The following description may be an operation for determining the operation mode for the electronic pen 200 on the basis of input made through the electronic pen (for example, the electronic pen 200 of FIG. 2) in operations 301 to 303 of FIG. 3. Hereinafter, the electronic device may include the electronic device 101 of FIG. 1 or at least a portion (for example, the processor 120) of the electronic device 101.

Referring to FIG. 8, the electronic device 101 may identify whether input through the electronic pen 200 related to the generation of content is detected in operation 801. For example, the processor 120 may identify whether input (for example, capturing input) by the electronic pen 200 corresponding to an icon (for example, the photographing button 403 of FIG. 4A) related to the generation of multimedia content is received through the input device 150. For example, the processor 120 may identify whether button input information of the electronic pen 200 is received through the communication module 190.

When input through the electronic pen 200 is detected (for example, "Yes" in operation 801), the electronic device 101 may identify the orientation of the electronic pen 200 in operation 803. The orientation of the electronic pen 200 may be identified on the basis of sensing data (for example, motion information of the electronic pen 200) of the 6-axis sensor (for example, the sensor module 260 of FIG. 2) included in the electronic pen 200 received from the electronic pen 200. For example, the sensing data of the 6-axis sensor included in the electronic pen 200 may be received from the electronic pen 200 in response to a request from the electronic device 101.

The electronic device 101 may identify whether the orientation of the electronic pen 200 corresponds to a first orientation in operation 805. For example, the first orientation may include a +z-axis direction, corresponding to the sky, among 6 axis directions.

When the electronic pen 200 is oriented in the first orientation (for example, "Yes" in operation 805), the electronic device 101 may configure the capturing mode as the operation mode of the electronic device 101 in operation 807. For example, when the nib of the electronic pen 200 is in the +z-axis direction facing the sky, the processor 120 may capture an image through the camera module 180 and then determine that no additional input has been made through the electronic pen 200. Accordingly, the processor 120 may configure the capturing mode for capturing the image through the camera module 180 as the operation mode of the electronic device 101.

When the electronic pen 200 is oriented in a second orientation (for example, "No" in operation 805), the electronic device 101 may configure the image-capturing-and-editing mode by the electronic pen 200 as the operation mode of the electronic device 101 in operation 809. For example, when the nib of the electronic pen 200 is in the −z-axis direction facing the ground, the processor 120 may capture an image through the camera module 180 and then determine that additional input through the electronic pen 200 is generated. Accordingly, the processor 120 may configure the image-capturing-and-editing mode for capturing the image through the electronic pen 200 and editing the captured image as the operation mode of the electronic device 101.

Figure 9:
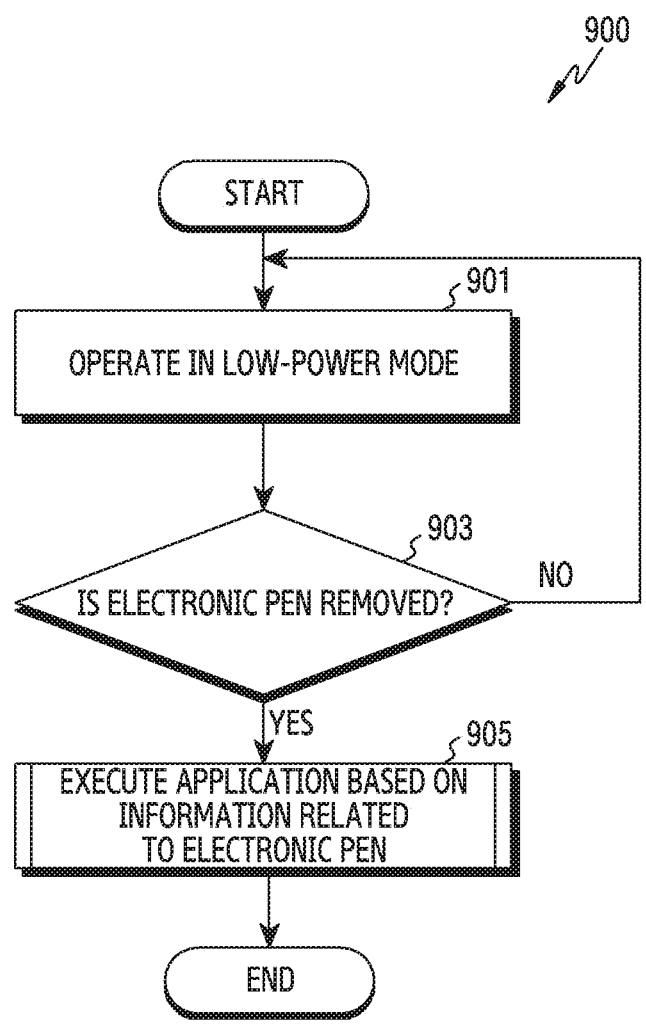
FIG. 9 is a flowchart illustrating an operation which the electronic device executes an application on the basis of information related to the electronic pen according to an embodiment of the disclosure.

FIG. 9 is a flowchart 900 illustrating an operation in which the electronic device executes an application on the basis of information related to the electronic pen according to an embodiment of the disclosure.

Hereinafter, the electronic device may include the electronic device 101 of FIG. 1 or at least a portion (for example, the processor 120) of the electronic device 101. The electronic pen may include the electronic pen 200 of FIG. 2 or at least a portion of the electronic pen 200.

Referring to FIG. 9, the electronic device 101 may be driven in the low-power mode in operation 901. The low-power mode may include an inactive state of at least one module included in the electronic device 101 in order to reduce the amount of power consumed by the electronic device 101. For example, the processor 120 and the display device 160 may be deactivated in the low-power mode.

The electronic device 101 may identify whether the electronic pen 200 is removed in operation 903. For example, the processor 120 may identify whether the electronic pen 200 is removed from the storage space of the electronic device 101.

When the electronic pen 200 is stored in the storage space (for example, "No" in operation 903), the electronic device 101 may maintain the low-power mode in operation 901.

When the electronic pen 200 is removed from the storage space (for example, "Yes" in operation 903), the electronic device 101 may execute the application 146 on the basis of information related to the electronic pen 200 in operation 905. For example, the information related to the electronic pen 200 may include at least one of whether hover input through the electronic pen 200 is detected, the time point at which the hover input is detected, the orientation of the electronic pen 200, and input information of a button included in the electronic pen 200. For example, when the electronic pen 200 is maintained in the first orientation (+z-axis direction) for a first predetermined time, the processor 120 may execute the camera application. For example, when an input of the button of the electronic pen 200 located within the hovering area is detected, the processor 120 may execute the memo application. For example, when a first input of the button of the electronic pen 200 located outside the hovering area is detected, the processor 120 may execute the camera application.

Figure 10:
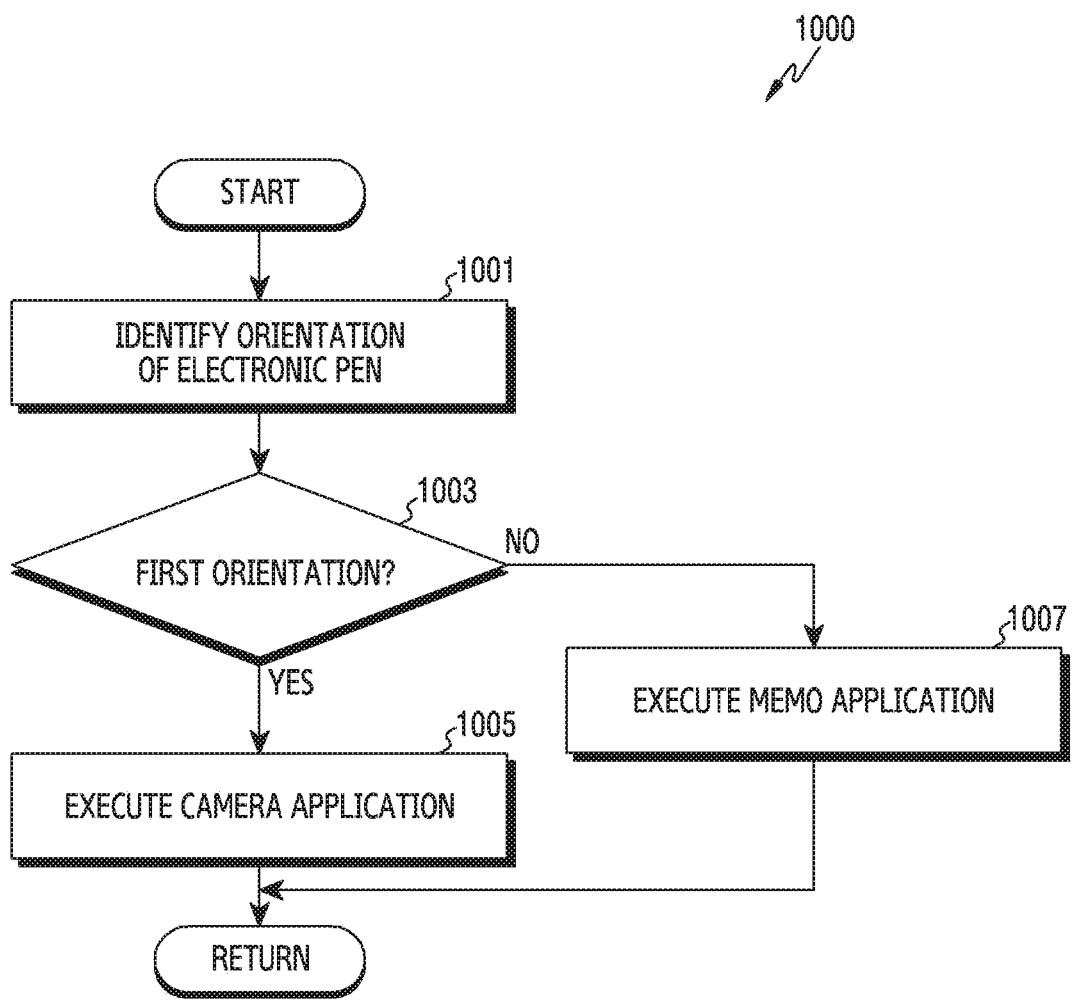
FIG. 10 is a flowchart illustrating an operation in which the electronic device executes an application corresponding to the orientation of the electronic pen according to an embodiment of the disclosure.

FIG. 10 is a flowchart 1000 illustrating an operation in which the electronic device executes an application corresponding to the orientation of the electronic pen according to an embodiment of the disclosure.

The following description may be an operation for executing the application (for example, the application 146 of FIG. 1) on the basis of information related to the electronic pen (for example, the electronic pen 200 of FIG. 2) in operation 905 of FIG. 9. Hereinafter, the electronic device may include the electronic device 101 of FIG. 1 or at least a portion (for example, the processor 120) of the electronic device 101.

Referring to FIG. 10, when the electronic pen 200 is removed (for example, "Yes" in operation 903 in FIG. 9), the electronic device 101 may identify the orientation of the electronic pen 200 in operation 1001. For example, the processor 120 may receive orientation information (sensing data of the 6-axis sensor) of the electronic pen 200 from the electronic pen 200 through the communication module 190. For example, the orientation information of the electronic pen 200 may be received from the electronic pen 200 in response to a request from the electronic device 101. For example, when removal of the electronic pen 200 from the electronic device 101 is detected, the electronic pen 200 may periodically transmit sensing data of the 6-axis sensor (for example, the sensing or sensor module 260 of FIG. 2) to the electronic device 101.

The electronic device 101 may identify whether the orientation of the electronic pen 200 corresponds to the first orientation in operation 1003. For example, the processor 120 may identify whether the orientation of the nib of the electronic pen 200 is a first orientation facing the sky on the basis of orientation information of the electronic pen 200 received from the electronic pen 200.

When the orientation of the electronic pen 200 corresponds to the first orientation (for example, the +z-axis direction) (for example, "Yes" in operation 1003), the electronic device 101 may execute the camera application in operation 1005. For example, when the nib of the electronic pen 200 continuously faces the sky (a first orientation) for a first predetermined time, the processor 120 may determine that no writing input through the electronic pen 200 is generated, and may execute the camera application. For example, when the camera application is executed, the processor 120 may activate the front camera of the electronic device 101 and operate in a selfie mode. For example, the display device 160 may display an image (a preview image) acquired through the camera module 180 on the lock screen (for example, on a higher display layer).

When the orientation of the electronic pen 200 corresponds to a second orientation (for example, -z-axis direction) (for example, "No" in operation 1003), the electronic device 101 may execute the memo application in operation 1007. For example, when the nib of the electronic pen 200 continuously faces the ground (a second orientation) for a first predetermined time, the processor 120 may determine that writing input through the electronic pen 200 is generated and execute the memo application. For example, the display device 160 may display an execution screen of the memo application on the lock screen (for example, on a higher display layer).

Figure 11:
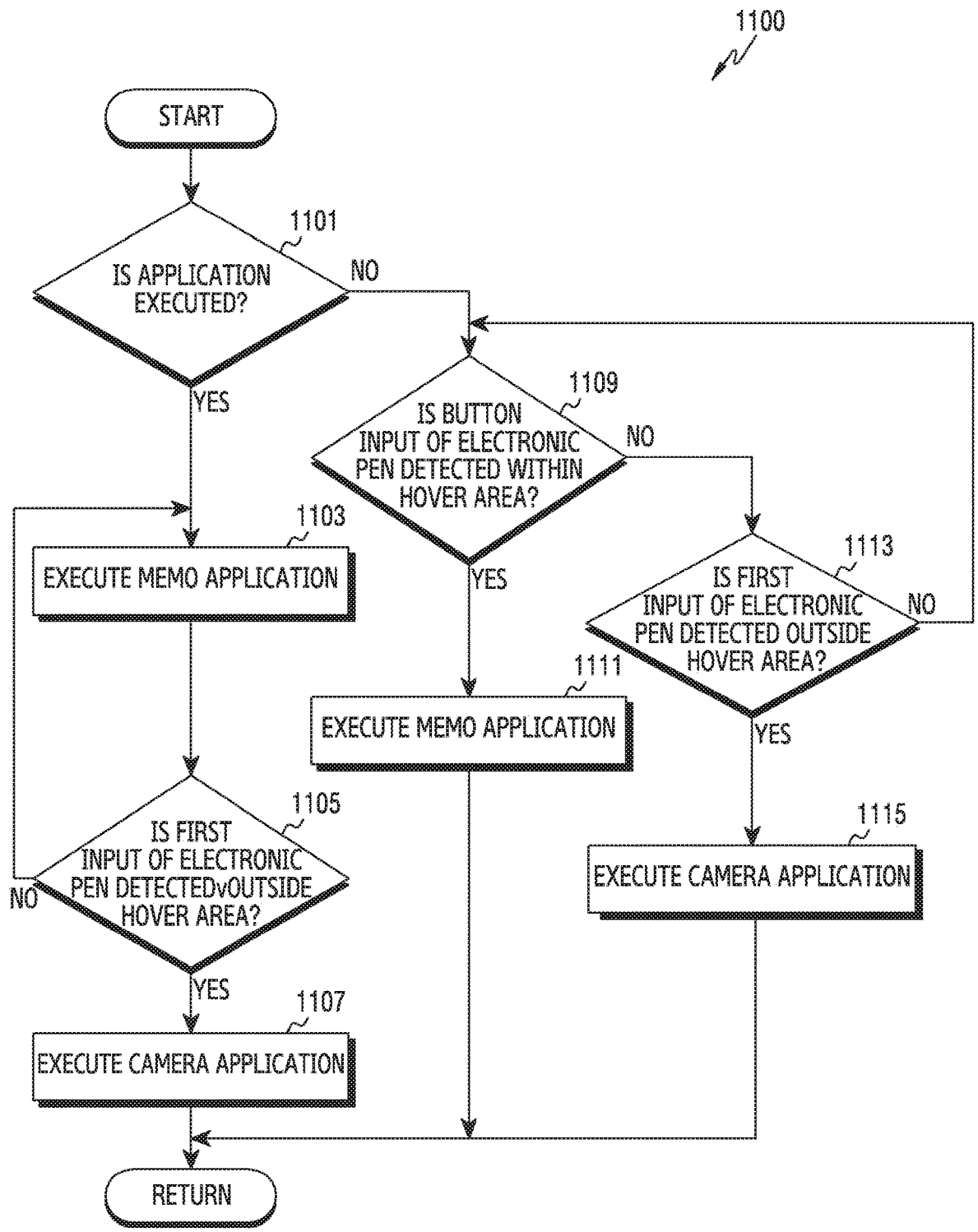
FIG. 11 is a flowchart illustrating an operation in which the electronic device executes an application on the basis of input through the electronic pen according to an embodiment of the disclosure.

FIG. 11 is a flowchart 1100 illustrating an operation in which the electronic device executes an application on the basis of the input through the electronic pen according to an embodiment of the disclosure.

The following description may be an operation for executing the application (for example, the application 146 of FIG. 1) on the basis of information related to the electronic pen (for example, the electronic pen 200 of FIG. 2) in operation 905 of FIG. 9. Hereinafter, the electronic device may include the electronic device 101 of FIG. 1 or at least a portion (for example, the processor 120) of the electronic device 101.

Referring to FIG. 11, when the electronic pen 200 is removed (for example, "Yes" in operation 903 in FIG. 3), the electronic device 101 may identify whether the application execution menu is configured as an active state in operation 1101. The application execution menu may include a menu for configuring whether to execute a predefined application (for example, a menu application) on the basis of removal of the electronic pen 200.

When the application execution menu is configured as the active state (for example, "Yes" in operation 1101 in FIG. 11), the electronic device 101 may execute a predefined memo application on the basis of removal of the electronic pen 200 in operation 1103. For example, the memo application is configured to be executed in the low-power mode, and may include at least a portion of the application executed in the normal mode of the electronic device 101, or may be a separate application.

The electronic device 101 may identify whether a first input through the button of the electronic pen located outside the hovering area is detected in the state in which the memo application is executed in operation 1105. For example, the processor 120 may identify whether a signal corresponding to the first input through the button of the electronic pen 200 is received through the communication module 190 (for example, short-range communication) in the state in which no hover input through the electronic pen 200 is detected. For example, the state in which no hover input is detected may include the state in which the magnitude of the electromagnetic field of the electronic pen 200 is smaller than a reference magnitude.

When the first input through the button of the electronic pen 200 located outside the hovering area is not detected (for example, "No" in operation 1105 in FIG. 11), the electronic device 101 may maintain execution of the memo application in operation 1103.

When the first input through the button of the electronic pen 200 located outside the hovering area is detected (for example, "Yes" in operation 1105 in FIG. 11), the electronic device 101 may execute the camera application in operation 1107. For example, the processor 120 may execute the camera application in the state in which the locked state of the electronic device 101 is maintained. In this case, the display device 160 may display the image acquired through the camera module 180 on a higher display layer of the lock screen of the electronic device 101. The image acquired through the camera module 180 may include an image acquired through the front camera, disposed in the same orientation as that of the display device 160 of the electronic device 101.

When the application execution menu is configured as an inactive state ("No" in operation 1101 in FIG. 11), the electronic device 101 may identify whether the input of the button of the electronic pen 200 located within the hovering area is detected in operation 1109. For example, the processor 120 may identify whether a signal corresponding to the button input is received from the electronic pen 200 through the communication module 190 (for example, short-range communication) in the state in which the hover input through the electronic pen 200 is maintained. When the hover input through the electronic pen 200 is maintained, the display device 160 may display the location at which the hover input is detected. For example, the button input of the electronic pen 200 may include at least one of single press, double press, and long press.

When the input of the button of the electronic pen 200 located within the hovering area is detected (for example, "Yes" in operation 1109 in FIG. 11), the electronic device 101 may execute the memo application in operation 1111. For example, the processor 120 may execute the memo application in the state in which the locked state of the electronic device 101 is maintained.

When no input of the button of the electronic pen 200 located with the hovering area is detected (for example, "No" in operation 1109 in FIG. 11), the electronic device 101 may identify whether the first input through the button of the electronic pen 200 located outside the hovering area is detected in operation 1113. For example, the processor 120 may identify whether a signal corresponding to the first input through the button of the electronic pen 200 is received through the communication module 190 (for example, short-range communication) in the state in which the intensity of the electromagnetic field received from the electronic pen 200 is smaller than the reference magnitude. For example, the first input through the button may indicate input by which pressing (input) of the button in the electronic pen 200 is continuously maintained for a third reference time.

When the first input through the button of the electronic pen 200 located outside the hovering area is not detected (for example, "No" in operation 1113 in FIG. 11), the electronic device 101 may identify whether the input of the button of the electronic pen 200 located within the hovering area is detected in operation 1109.

When the first input through the button of the electronic pen 200 located outside the hovering area is detected (for example, "Yes" in operation 1113 in FIG. 11), the electronic device 101 may execute the camera application in operation 1115. For example, the display device 160 may display the image (preview image) acquired through the camera module 180 on a higher display layer of the lock screen of the electronic device 101. The image acquired through the camera module 180 may include an image acquired through the front camera disposed in the same orientation as that of the display device 160 of the electronic device 101.

Figure 12:
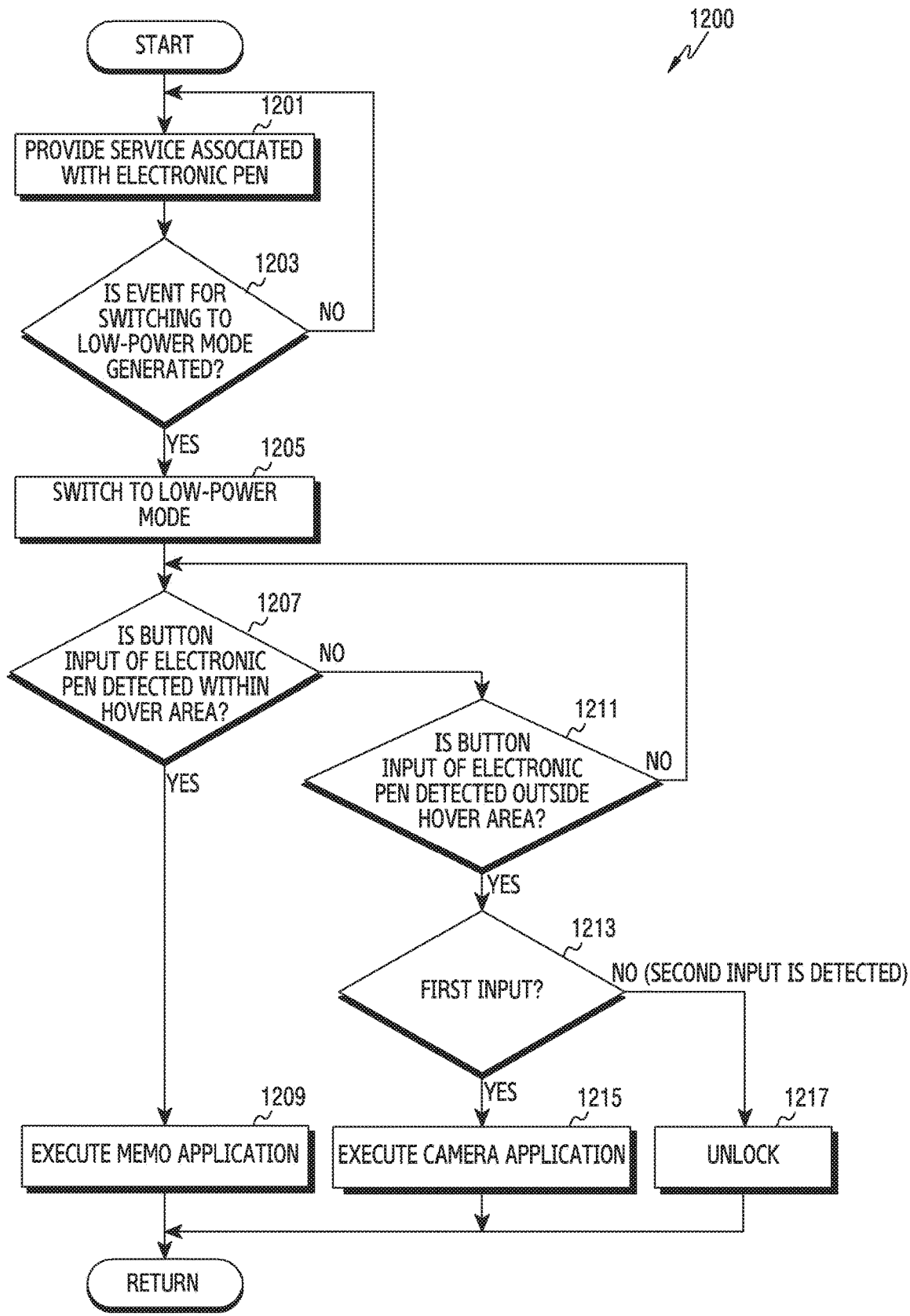
FIG. 12 is a flowchart illustrating an operation in which the electronic device executes an application on the basis of button input made through the electronic pen according to an embodiment of the disclosure.

FIG. 12 is a flowchart 1200 illustrating an operation in which the electronic device executes an application on the basis of the button input of the electronic pen according to an embodiment of the disclosure.

Hereinafter, the electronic device may include the electronic device 101 of FIG. 1 or at least a portion (for example, the processor 120) of the electronic device 101.

Referring to FIG. 12, the electronic device 101 may provide a service associated with the electronic pen 200 in operation 1201. For example, the processor 120 may execute at least one application in the state in which the electronic pen 200 is removed from the electronic device 101.

The electronic device 101 may identify whether an event for switching to the low-power mode is generated in operation 1203. For example, when the electronic device 101 receives no input for a second predetermined time, the processor 120 may determine that the event for switching to the low-power mode is generated.

When an event for switching to the low-power mode is not generated (for example, "No" in operation 1203 in FIG. 12), the electronic device 101 may execute at least one application in the state in which the electronic pen 200 is removed in operation 1201.

When an event for switching to the low-power mode is generated (for example, "Yes" in operation 1203 in FIG. 12), the electronic device 101 may switch the operation mode of the electronic device 101 to the low-power mode in operation 1205. For example, the low-power mode may include an operation mode for deactivating at least one module (for example, the processor 120 and the display device 160) included in the electronic device 101 in order to reduce the amount of power consumed by the electronic device 101.

The electronic device 101 may identify whether the input of the button of the electronic pen 200 located within the hovering area is detected in the low-power mode in operation 1207. For example, when an electromagnetic field larger than or equal to the reference magnitude is received from the electronic pen 200, the processor 120 may determine that the electronic pen 200 is located within the hovering area. The processor 120 may identify whether a signal corresponding to the button input is received from the electronic pen 200 through the communication module 190 (for example, short-range communication) in the state in which an electromagnetic field larger than or equal to the reference magnitude is continuously received from the electronic pen 200. For example, the button input of the electronic pen 200 may include at least one of single press, double press, and long press.

When the input of the button of the electronic pen 200 located within the hovering area is detected (for example, "Yes" in operation 1207 in FIG. 12), the electronic device 101 may execute the memo application in operation 1209. For example, the processor 120 may control the display device 160 to display a user interface of the memo application such that it overlaps at least a portion of the lock screen of the electronic device 101 displayed on the display device 160.

When input of the button of the electronic pen 200 located within the hovering area is not detected (for example, "No" in operation 1207 in FIG. 12), the electronic device 101 may identify whether input of the button of the electronic pen 200 located outside the hovering area is detected in operation 1211. For example, the processor 120 may identify whether a signal corresponding to the button input of the electronic pen 200 is received through the communication module 190 (for example, short-range communication) in the state in which hover input through the electronic pen 200 is not detected. For example, the state in which no hover input is detected may include a state in which an electromagnetic field smaller than a reference magnitude is received from the electronic pen 200 or no electromagnetic field is received from the electronic pen 200.

When input of the button of the electronic pen 200 located outside the hovering area is not detected (for example, "No" in operation 1211 in FIG. 12), the electronic device 101 may identify whether input of the button of the electronic pen 200 located within the hovering area is detected in the low-power mode in operation 1207.

When input of the button of the electronic pen 200 located outside the hovering area is detected (for example, "Yes" in operation 1211 in FIG. 12), the electronic device 101 may identify whether the button input of the electronic pen 200 corresponds to a first input in operation 1213. For example, the first input may be input by which pressing (input) of the button of the electronic pen 200 is continuously maintained for a third reference time.

When the electronic device 101 receives the first input from the electronic pen 200 located outside the hovering area (for example, "Yes" in operation 1213 in FIG. 12), the electronic device 101 may unlock the electronic device 101 and execute the camera application in operation 1215. For example, when long-press input is received from the electronic pen 200 located outside the hovering area, the processor 120 may determine that the user continuously uses the electronic device 101. Accordingly, the processor 120 may unlock the electronic device 101 and execute the camera application.

When a second input is received from the electronic pen 200 located outside the hovering area (for example, "No" in operation 1213 in FIG. 12), the electronic device 101 may unlock the electronic device 101 in operation 1217. The display device 160 may display the user interface that was displayed right before the electronic device 101 switched to the low-power mode. For example, the second input may include single pressing or double pressing of the button of the electronic pen 200.

According to various embodiments of the disclosure, a method of operating an electronic device (for example, the electronic device 101 of FIG. 1) may include an operation of identifying whether an electronic pen (for example, the electronic pen 200 of FIG. 2) inserted into a recess disposed inside a housing of the electronic device and extending a long length so as to be removable therefrom is removed from the recess in a low-power mode, and an operation of identifying information related to the electronic pen when the electronic pen is removed from the recess; and executing an application, based on at least a portion of the information related to the electronic pen.

According to various embodiments, the information related to the electronic pen includes at least one of whether hover input through the electronic pen is detected, the time point at which the hover input is detected, the orientation of the electronic pen, and input information of a button included in the electronic pen.

According to various embodiments, the operation of identifying the information related to the electronic pen may include an operation of receiving at least one of the orientation of the electronic pen and the input information of the button included in the electronic pen from the electronic pen through short-range wireless communication using a wireless communication circuit (for example, the communication module 190 of FIG. 1) of the electronic device.

According to various embodiments, the short-range wireless communication may include at least one of Bluetooth and Bluetooth Low Energy (BLE).

According to various embodiments, the operation of executing the application may include an operation of acquiring the input information of the button included in the electronic pen, an operation of executing a memo application when the input information of the button included in the electronic pen satisfies a first predetermined condition, and an operation of executing a camera application when the input information of the button included in the electronic pen satisfies a second predetermined condition.

According to various embodiments, the first predetermined condition may include a condition related to input of a button of the electronic pen located within a hovering area, and the second predetermined condition may include a condition related to input of a button of the electronic pen located outside the hovering area.

According to various embodiments, the operation of executing the application may include an operation of executing a camera application when the orientation of the electronic pen is maintained in a first orientation for a predetermined time and an operation of executing a memo application when the orientation of the electronic pen is maintained in a second orientation for a predetermined time.

According to various embodiments, the orientation of the electronic pen may be identified based on sensing data of a 6-axis sensor included in the electronic pen received from the electronic pen through the short-range wireless communication.

Through the electronic device and the method of operating the same according to various embodiments, the user of the electronic device can easily use the electronic pen by executing the operation mode related to the electronic pen on the basis of at least one of input through the electronic pen, application information, and an orientation of the electronic pen.

Through the electronic device and the method of operating the same according to various embodiments, when the electronic pen is removed in a low-power mode, it is possible to increase ease of use of the electronic pen by the user by executing an application corresponding to input related to the electronic pen.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a display device exposed through a portion of the housing;
   a recess disposed inside the housing and extending along a length of the housing;
   an electronic pen insertable in the recess and removable therefrom;
   at least one processor located inside the housing and operatively connected to the display device; and
   a memory operatively connected to the at least one processor,
   wherein the memory stores instructions that, when executed, configure the at least one processor to:
   identify whether the electronic pen is removed from the recess in a low-power mode,
   receive information related to the electronic pen when the electronic pen is removed from the recess, wherein the information related to the electronic pen includes whether a hover input through the electronic pen is detected and input information of a button included in the electronic pen,
   identify a first application when the information related to the electronic pen indicates an input of the button included in the electronic pen located within a hovering area,
   identify a second application when the information related to the electronic pen indicates an input of the button included in the electronic pen located outside the hovering area, and
   execute the identified application.

2. The electronic device of claim 1,
   wherein the housing comprises a wireless communication circuit, and
   wherein the instructions, when executed, further configure the at least one processor to receive the input information of the button included in the electronic pen from the electronic pen through short-range wireless communication using the wireless communication circuit.

3. The electronic device of claim 2, wherein the short-range wireless communication includes at least one of Bluetooth (BT) or Bluetooth Low Energy (BLE).

4. The electronic device of claim 1,
   wherein the first application is a memo application, and
   wherein the second application is a camera application.

5. A method of operating an electronic device, the method comprising:
   identifying whether an electronic pen, insertable into a recess disposed inside a housing and extending along a length of the housing and removable therefrom, is removed from the recess in a low-power mode;
   receiving information related to the electronic pen when the electronic pen is removed from the recess, wherein the information related to the electronic pen includes whether a hover input through the electronic pen is detected and input information of a button included in the electronic pen;
   identifying a first application when the information related to the electronic pen indicates an input of the button included in the electronic pen located within a hovering area;

identifying a second application when the information related to the electronic pen indicates an input of the button included in the electronic pen located outside the hovering area; and executing the identified application.

6. The method of claim 5, wherein the receiving of the information related to the electronic pen comprises receiving the input information of the button included in the electronic pen from the electronic pen through short-range wireless communication using a wireless communication circuit of the electronic device.

7. The method of claim 6, wherein the short-range wireless communication includes at least one of Bluetooth (BT) or Bluetooth Low Energy (BLE).

8. An electronic device comprising:

a housing;

a display device exposed through a portion of the housing;

a recess disposed inside the housing and extending along a length of the housing;

an electronic pen insertable into the recess and removable therefrom;

at least one processor located inside the housing and operatively connected to the display device; and a memory operatively connected to the at least one processor, wherein the memory stores instructions that, when executed, configure the at least one processor to:

generate content when an input through the electronic pen is detected, identify an operation mode of the electronic device related to the content, based on an orientation of the electronic pen, control the electronic device to operate in a first mode when the orientation of the electronic pen is a first orientation, and control the electronic device to operate in a second mode when the orientation of the electronic pen is a second orientation, different from the first orientation.

9. The electronic device of claim 8, wherein the housing comprises a wireless communication circuit, and wherein the instructions, when executed, further configure the at least one processor to identify the orientation of the electronic pen, based on sensing data of a 6-axis sensor included in the electronic pen received from the electronic pen through short-range wireless communication using the wireless communication circuit.

10. The electronic device of claim 8, further comprising:

a plurality of cameras, wherein the instructions, when executed, further configure the at least one processor to activate at least one of the plurality of cameras corresponding to the orientation of the electronic pen.

* * * * *